(12) United States Patent
Ishikawa et al.

(10) Patent No.: US 12,384,687 B2
(45) Date of Patent: Aug. 12, 2025

(54) METHOD FOR PRODUCING AEI ZEOLITE

(71) Applicant: TOSOH CORPORATION, Yamaguchi (JP)

(72) Inventors: Tomoya Ishikawa, Yamaguchi (JP); Yoshitaka Yamasaki, Yamaguchi (JP)

(73) Assignee: TOSOH CORPORATION, Yamaguchi (JP)

(*) Notice: Subject to any disclaimer, the term of this patent is extended or adjusted under 35 U.S.C. 154(b) by 148 days.

(21) Appl. No.: 17/613,321

(22) PCT Filed: May 27, 2020

(86) PCT No.: PCT/JP2020/020865
§ 371 (c)(1),
(2) Date: Nov. 22, 2021

(87) PCT Pub. No.: WO2020/241668
PCT Pub. Date: Dec. 3, 2020

(65) Prior Publication Data
US 2022/0227636 A1    Jul. 21, 2022

(30) Foreign Application Priority Data
May 29, 2019  (JP) ................. 2019-100637

(51) Int. Cl.
*B01J 29/00*    (2006.01)
*C01B 39/48*    (2006.01)

(52) U.S. Cl.
CPC ................... *C01B 39/48* (2013.01)

(58) Field of Classification Search
None
See application file for complete search history.

(56) References Cited

U.S. PATENT DOCUMENTS

| | | | |
|---|---|---|---|
| 5,958,370 A | 9/1999 | Zones et al. | |
| 10,112,184 B2 | 10/2018 | Yang et al. | |
| 2015/0210556 A1* | 7/2015 | Itabashi | B01J 37/04 423/709 |
| 2017/0128921 A1* | 5/2017 | Yang | C01B 39/48 |

| | | | |
|---|---|---|---|
| 2017/0259250 A1 | 9/2017 | Tanaka et al. | |
| 2018/0230017 A1 | 8/2018 | Ishikawa et al. | |
| 2019/0009257 A1 | 1/2019 | Takamitsu et al. | |

FOREIGN PATENT DOCUMENTS

| | | | |
|---|---|---|---|
| JP | 2016-104690 A | | 6/2016 |
| JP | 2017-36204 A | | 2/2017 |
| JP | 2017-39638 A | | 2/2017 |
| JP | 2017-048105 A | | 3/2017 |
| JP | 2017-81809 A | | 5/2017 |
| WO | 2016/080547 A1 | | 5/2016 |
| WO | 2017038662 | * | 3/2017 |
| WO | 2017/090382 A1 | | 6/2017 |

OTHER PUBLICATIONS

NJ Dept of Health and Senior Services. Fume Silica. 2003 (Year: 2003).*
International Preliminary Report on Patentability issued in International Patent Application No. PCT/JP2020/020865 dated Nov. 16, 2021 (English).
Daigo Shimono et al., "Synthesis of high silica AEI zeolite from amorphous raw materials by various synthetic routes", Hiroshima university Graduate School of Engineering, 2017, PP.
International Search Report issued in International Patent Application No. PCT/JP2020/020865, dated Aug. 4, 2020, along with English Translation thereof.
Written Opinion of the International Searching Authority issued in International Patent Application No. PCT/JP2020/020865, dated Aug. 4, 2020, along with English Translation thereof.

* cited by examiner

*Primary Examiner* — Sheng H Davis
(74) *Attorney, Agent, or Firm* — GREENBLUM & BERNSTEIN, P.L.C.

(57) ABSTRACT

Provided is at least one of a production method that can obtain AEI zeolite that has a silica-to-alumina molar ratio suitable as a nitrogen oxide-reducing catalyst or a support thereof and that involves a shorter crystallization time and higher yield compared to a typical AEI zeolite production method that does not use crystalline aluminosilicate as a starting material, or an AEI zeolite production method that is expected to be industrially applicable. An AEI zeolite production method includes hydrothermally processing an amorphous composition containing an amorphous silica source, an amorphous alumina source, an alkali source and water, and then crystallizing a raw material composition obtained by mixing an organic structure-directing agent and the amorphous composition.

5 Claims, No Drawings

METHOD FOR PRODUCING AEI ZEOLITE

TECHNICAL FIELD

The present disclosure relates to an AEI zeolite production method.

BACKGROUND ART

AEI zeolite is a crystalline aluminosilicate, and has been investigated to apply as an olefin-producing catalyst or a selective catalytic reduction catalyst (also known as an SCR catalyst). AEI zeolite is synthesized through structural transformation of Y zeolite by using Y zeolite as a starting material (PTL 1).

However, an AEI zeolite production method that does not use Y zeolite as a starting material has been investigated, since Y zeolite is expensive. Heretofore, AEI zeolite production methods that use amorphous compounds as starting materials other than Y zeolite, such as crystalline aluminosilicates other than Y zeolite (PTL 2), amorphous aluminosilicates (PTL 3, PTL 4 and NPL 1) and silica, e.g., fumed silica, and aluminum hydroxide (PTL 5), has been reported.

CITATION LIST

Patent Literature

PTL 1: U.S. Pat. No. 5,958,370
PTL 2: Japanese Unexamined Patent Application Publication No. 2017-48105.
PTL 3: Japanese Unexamined Patent Application Publication No. 2017-36204
PTL 4: Japanese Unexamined Patent Application Publication No. 2017-39638
PTL 5: International Publication No. 2016/080547

Non Patent Literature

NPL 1: 33rd Zeolite Kenkyu Happyoukai [Workshop on Zeolite] A12 (2017)

SUMMARY OF INVENTION

Technical Problem

An AEI zeolite production method, without using crystalline aluminosilicate as a starting material, is anticipated to apply for industrial use. However, a long crystallization process has been necessary to achieve high yield in reported AEI zeolite production methods reported that use a starting material other than crystalline aluminosilicate. An object of the present disclosure is to provide at least one of a production method, compared to a typical AEI zeolite production method that does not use crystalline aluminosilicate as a starting material, that can obtain AEI zeolite having a silica-to-alumina molar ratio suitable as a nitrogen oxide-reducing catalyst or a support thereof, by a shorter crystallization time with higher yield, or an AEI zeolite production method that is expected to be industrially applicable.

Solution to Problem

The present inventors of have conducted studies on an AEI zeolite production method that uses a starting material other than crystalline aluminosilicate. As a result, it has been found that AEI zeolite crystallizes efficiently from an amorphous material by focusing on the relationship between the state of raw materials in the composition and an organic structure-directing agent during crystallization.

That is, the gist of the present disclosure is as follows.

[1] An AEI zeolite production method comprising a step of hydrothermally processing an amorphous composition containing an amorphous silica source, an amorphous alumina source, an alkali source and water, and then crystallizing a raw material composition obtained by mixing an organic structure-directing agent and the amorphous composition.

[2] The AEI zeolite production method described in [1] above, wherein the raw material composition contains at least one of a silica source, an alumina source, an alkali source and water.

[3] The AEI zeolite production method described in [1] or [2] above, wherein the raw material composition has a hydroxide ion-to-silica molar ratio of 0.40 or less.

[4] The AEI zeolite production method described in any one [1] to [3] above, wherein the raw material composition does not contain Y zeolite.

[5] The AEI zeolite production method described in any one of [1] to [4] above, wherein the amorphous composition has molar compositions below, where M is an alkali metal:
$SiO_2/Al_2O_3$ ratio=12 or more and 25 or less
$Na/SiO_2$ ratio=0.05 or more and 0.3 or less
$M/SiO_2$ ratio=0.05 or more and 0.4 or less
$OH/SiO_2$ ratio=0.1 or more and 0.4 or less
$H_2O/SiO_2$ ratio=8 or more and less than 20

[6] The production method described in any one of [1] to [5] above, wherein the raw material composition has molar compositions below, where M is an alkali metal and SDA is an organic structure-directing agent:
$SiO_2/Al_2O_3$ ratio=20 or more and 50 or less
$Na/SiO_2$ ratio=0.05 or more and 0.3 or less
$M/SiO_2$ ratio=0.05 or more and 0.5 or less
$SDA/SiO_2$ ratio=0.1 or more and 0.3 or less
$OH/SiO_2$ ratio=0.1 or more and 0.4 or less
$H_2O/SiO_2$ ratio=8 or more and less than 20

[7] The AEI zeolite production method described in any one of [1] to [6] above, wherein the raw material composition has a fluorine content of 100 mass ppm or less.

Advantageous Effects of Invention

The present disclosure can provide at least one of a production method, compared to a typical AEI zeolite production method that does not use crystalline aluminosilicate as a starting material, that can obtain AEI zeolite having a silica-to-alumina molar ratio suitable as a nitrogen oxide-reducing catalyst or a support thereof and that involves a shorter crystallization time with higher yield, or an AEI zeolite production method that is expected to be industrially applicable.

DESCRIPTION OF EMBODIMENTS

Hereinafter, an AEI zeolite production method according to the present disclosure is described through some examples of embodiments.

This embodiment concerns an AEI zeolite production method comprising a step of hydrothermally processing an amorphous composition containing an amorphous silica source, an amorphous alumina source, an alkali source and water, and then crystallizing a raw material composition obtained by mixing an organic structure-directing agent and the amorphous composition.

AEI zeolite obtained through the production method of the present embodiment is zeolite having an AEI structure, and is, in particular, a crystalline aluminosilicate having an AEI structure.

The structure of zeolite in this embodiment is a structure specified by the Structure Commission of the International Zeolite Association (IZA), and the "AEI structure" is a structure that is given an AEI type structural code. The AEI structure can be identified by comparing a structure with a powder X-ray diffraction (hereinafter, referred to as "XRD") pattern described in Collection of simulated XRD powder patterns for zeolites, Fifth revised edition, p. 23 (2007), or an XRD pattern in AEI under Zeolite Framework Types described in a website provided by the Structure Commission of the IZA at http://www.iza-struture.org/databases/.

A "crystalline aluminosilicate" is a crystalline complex compound of alumina and silica, and has a framework constituted by repeating networks of aluminum (Al) and silicon (Si) linked via oxygen (O). In this embodiment, terms such as framework, crystal structure and crystal phase are used to mean the same thing.

An example of AEI zeolite obtained by the production method of the present embodiment is a crystalline aluminosilicate that has an XRD pattern equivalent to SSZ-39.

In the production method of the present embodiment, an amorphous composition containing an amorphous silica source, an amorphous alumina source, an alkali source and water is hydrothermally processed. It is considered that the hydrothermal process generates a structural unit that can induce AEI zeolite in the amorphous composition, and thereby promotes crystallization of AEI zeolite in the subsequent step.

The amorphous alumina source is aluminum (Al) or an aluminum-containing compound other than crystalline aluminosilicate, and is, for example, at least one selected from the group consisting of aluminum hydroxide, aluminum oxide, aluminum sulfate, aluminum chloride, aluminum nitrate, amorphous aluminosilicate, metallic aluminum, pseudo-Boehmite, alumina sol and aluminum alkoxide, and preferably at least one selected from the group consisting of aluminum hydroxide, aluminum oxide, aluminum sulfate, aluminum chloride, aluminum nitrate, amorphous aluminosilicate, alumina sol and aluminum alkoxide. From the industrial viewpoint, the amorphous alumina source is preferably at least one selected from the group consisting of aluminum hydroxide, aluminum oxide, aluminum sulfate, aluminum chloride and amorphous aluminosilicate, is more preferably at least one selected from the group consisting of aluminum hydroxide, aluminum oxide, aluminum sulfate, aluminum chloride and amorphous aluminosilicate, is yet more preferably at least one selected from the group consisting of aluminum oxide, aluminum sulfate, aluminum chloride and amorphous aluminosilicate, and is still more preferably amorphous aluminosilicate.

The amorphous silica source is silicon (Si) or a silicon-containing compound other than crystalline aluminosilicate, and is, for example, at least one selected from the group consisting of silica sol, fumed silica, colloidal silica, precipitated silica, amorphous silicic acid and amorphous aluminosilicate, and is preferably at least one selected from amorphous silicic acid and amorphous aluminosilicate.

An example of a particularly preferable example of the amorphous alumina source and the amorphous silica source is amorphous aluminosilicate that has a silica-to-alumina molar ratio (hereinafter may also be referred to as the "$SiO_2/Al_2O_3$ ratio") of more than 0.7 and less than 2000 (a silica content of more than 20 mass % and less than 100 mass %), 5 or more and 300 or less (a silica content of 64 mass % or more and 99 mass % or less), 10 or more and 200 or less (a silica content of 78 masse or more and 98 masse or less), or 10 or more and 90 or less (a silica content of 78 mass % or more and 97 mass % or less). In another embodiment, the $SiO_2/Al_2O_3$ ratio of the amorphous aluminosilicate serving as the amorphous alumina source and the amorphous silica source is, for example, 5 or more, 10 or more, 13 or more or 15 or more, and less than 2000, 300 or less, 200 or less, 90 or less, 50 or less, 30 or less or 25 or less.

The production method of the present embodiment is more industrially suitable since amorphous compounds are used as starting substances and thus the production cost is suppressed. Thus, the amorphous composition preferably does not contain FAU zeolite, in particular, Y zeolite.

The alkali source is an alkali metal element-containing compound or an alkali metal, and is, for example, at least one selected from the group consisting of hydroxides, carbonates, sulfates, chlorides, bromides and iodides of alkali metals, preferably at least one selected from the group consisting of hydroxides, chlorides, bromides and iodides of alkali metals and more preferably a hydroxide of an alkali metal.

The alkali metal (element) is, for example, at least one selected from the group consisting of sodium, potassium, rubidium and cesium, preferably at least one selected from sodium and potassium and more preferably sodium.

The alkali metal may be sodium only; however, for the tendency to promote generation of a structural unit that can induce AEI zeolite, the alkali metal (element) is preferably sodium and at least one selected from the group consisting of potassium, rubidium and cesium, and is more preferably potassium and sodium.

Water may be distilled water, deionized water or pure water; furthermore, water derived from other components contained in the amorphous composition, such as a water-containing compound, can also be considered as water in the amorphous composition.

The amorphous composition does not have to contain seed crystal. Meanwhile, for the tendency to promote generation of a structural unit that can induce AEI zeolite, the amorphous composition may contain seed crystal in an amount sufficiently small relative to the amorphous silica source and the amorphous alumina source.

An example of the seed crystal mixed in the amorphous composition is at least one selected from the group consisting of AEI zeolite, CHA zeolite, OFF zeolite, ERI zeolite, FER zeolite, HEU zeolite, MOR zeolite, KFI zeolite, AFX zeolite, AFT zeolite, EAB zeolite, GME zeolite and LEV zeolite.

Preferable compositions of the amorphous composition in terms of molar (mol) ratio are, for example, as follows: the silica-to-alumina molar ratio ($SiO_2/Al_2O_3$ ratio) is 5 or more and 50 or less, 10 or more and 30 or less, 10 or more and 29 or less, or 15 or more and 25 or less; the alkali metal-to-silica molar ratio (hereinafter, may also be referred to as the "$M/SiO_2$ ratio") is 0.1 or more and 0.6 or less, 0.1 or more and 0.4 or less, 0.1 or more and 0.3 or less or 0.1 or more and 0.2 or less; the hydroxide ion ($OH^-$)-to-silica molar ratio (hereinafter, may also be referred to as the "$OH/SiO_2$ ratio") is 0.1 or more and 0.6 or less, 0.1 or more and 0.4 or less, 0.1 or more and 0.3 or less or 0.1 or more and 0.2 or less; and the water-to-silica molar ratio (hereinafter, may also be referred to as the "$H_2O/SiO_2$ ratio") is 3 or more and 50 or less, 5 or more and 30 or less or 8 or more and 20 or less.

When the amorphous composition contains sodium and at least one selected from the group consisting of potassium, rubidium and cesium, the molar ratio of at least one selected from the group consisting of potassium, rubidium and cesium to silica (hereinafter, may also be referred to as the "$K/SiO_2$ ratio" or, collectively, "$(K+Rb+Cs)/SiO_2$ ratio" or the like) is, for example, 0 or more and 0.5 or less, preferably 0 or more and 0.3 or less and more preferably 0 or more and 0.25 or less; and the sodium-to-silica molar ratio (hereinafter, may also be referred to as the "$Na/SiO_2$ ratio") is, for example, 0.01 or more and 1.0 or less, preferably 0.05 or more and 0.5 or less and more preferably 0.1 or more and 0.3 or less.

The amorphous composition preferably does not contain quaternary ammonium cations and other organic structure-directing agents, and particularly preferably does not contain an organic structure-directing agent that directs the AEI structure.

The amorphous composition particularly preferably has the following molar compositions. Here, M is alkali metal (in other words, all alkali metals in the amorphous composition), and is preferably (Na+K).

$SiO_2/Al_2O_3$ ratio=12 or more and 25 or less and preferably 15 or more and 23 or less $Na/SiO_2$ ratio=0.05 or more and 0.3 or less and preferably 0.07 or more and 0.23 or less $M/SiO_2$ ratio=0.05 or more and 0.4 or less and preferably 0.1 or more and 0.3 or less $OH/SiO_2$ ratio=0.1 or more and 0.4 or less and preferably 0.1 or more and 0.3 or less $H_2O/SiO_2$ ratio=8 or more and less than 20 and preferably 10 or more and 18 or less Note that when the alkali metal contained in the amorphous composition is sodium only, the $M/SiO_2$ ratio is equal to the $Na/SiO_2$ ratio.

The hydrothermal process preferably involves processing the amorphous composition at 100° C. or higher. Processing the amorphous composition at 100° C. or higher promotes generation of a structural unit (building unit) that can form AEI zeolite in the amorphous composition, and, furthermore, a composite-building unit, which is a three-dimensional building unit, can be easily grown.

From the viewpoint of shortening the processing time, the hydrothermal process is preferably performed in an airtight container at a high-temperature self-generating pressure. The hydrothermal process temperature is 100° C. or higher, preferably 130° C. or higher and more preferably 160° C. or higher. The hydrothermal process temperature need not be increased beyond what is necessary and is, for example, 230° C. or lower and preferably 200° C. or lower. In the hydrothermal process, the amorphous composition may be either in a stirred state or in a still-standing state.

The production method of the present embodiment includes a step of crystallizing a raw material composition obtained by mixing the hydrothermally processed amorphous composition and an organic structure-directing agent (hereinafter this step may also be referred to as the "crystallizing step"). AEI zeolite is obtained from the raw material composition through the crystallizing step. It is assumed that the co-presence of the hydrothermally processed amorphous composition and the organic structure-directing agent (hereinafter may also be referred to as the "SDA") promotes crystallization of AEI zeolite, particularly, AEI zeolite that has a $SiO_2/Al_2O_3$ ratio suitable as a nitrogen oxide-reducing catalyst or a support thereof (for example, a $SiO_2/Al_2O_3$ ratio of 12.5 or more and 100 or less, 15 or more and 50 or less, 15 or more and 30 or less, 16 or more and 25 or less or 18 or more and 23 or less) compared to when a composition in which these two are co-present as starting materials is crystallized.

The SDA may be a cation that directs AEI zeolite. An example of known cations that direct AEI zeolite is at least one selected from the group consisting of a 1,1,3,5-tetramethylpiperidinium cation, a 1,1-diethyl-2,6-dimethylpiperidinium cation, a 1,1,2,6-tetramethylpiperidinium cation, a 1-ethyl-1,2,6-trimethylpiperidinium cation and a 1,1,2-triethylpiperidinium cation; and at least one selected from a 1,1,3,5-tetramethylpiperidinium cation (hereinafter, may also be referred to as "$TMP^+$") and a 1,1-diethyl-2,6-dimethylpiperidinium cation (hereinafter, may also be referred to as "$DEDMP^+$") is preferable and $TMP^+$ is more preferable.

The SDA may be in a salt state when contained in the raw material composition, and the salt of the SDA is, for example, at least one selected from the group consisting of hydroxides, chlorides, bromides and iodides of the SDA, and is preferably at least one selected from the group consisting of hydroxides, chlorides and bromides of the SDA.

The salt of the SDA is particularly preferably at least one selected from the group consisting of 1,1,3,5-tetramethylpiperidinium hydroxide, 1,1,3,5-tetramethylpiperidinium bromide and 1,1,3,5-tetramethylpiperidinium chloride, particularly, at least one selected from 1,1,3,5-tetramethylpiperidinium hydroxide and 1,1,3,5-tetramethylpiperidinium bromide, and still more particularly 1,1,3,5-tetramethylpiperidinium hydroxide.

In order to adjust the compositions such as $SiO_2/Al_2O_3$ ratio of the amorphous composition and the raw material composition, in the crystallizing step, a raw material composition obtained by mixing the hydrothermally processed amorphous composition with an SDA and at least one selected from the group consisting of an alumina source, a silica source, an alkali source and water as necessary may be crystallized. The $SiO_2/Al_2O_3$ ratio of the raw material composition is preferably greater than the $SiO_2/Al_2O_3$ ratio of the amorphous composition. It is considered that, when the $SiO_2/Al_2O_3$ ratio of the raw material composition is greater than that of the amorphous composition, the obtained AEI zeolite tends to undergo less refinement. The $SiO_2/Al_2O_3$ ratio of the raw material composition is, for example, 1 or more, 3 or more, 5 or more, 7 or more or 10 or more higher than the $SiO_2/Al_2O_3$ ratio of the amorphous composition.

The alumina source, the silica source, the alkali source and water that can be used are, respectively, the same as the amorphous alumina source, the amorphous silica source, the alkali source and water used in the amorphous composition. In the raw material composition, an example of a particularly preferable alumina source and a particularly preferable silica source is amorphous aluminosilicate. Amorphous aluminosilicate preferably has a $SiO_2/Al_2O_3$ ratio of 5 or more, 10 or more, 13 or more or 15 or more, and less than 2000, 300 or less, 200 or less, 150 or less, 90 or less, 50 or less, 30 or less or 25 or less. The raw material composition may contain two or more amorphous aluminosilicates having different $SiO_2/Al_2O_3$ ratios.

For the tendency to promote crystallization of AEI zeolite, the raw material composition may contain seed crystal in an amount sufficiently small relative to the amorphous silica source and the amorphous alumina source.

For example, the raw material composition is mixed with seed crystal in such a manner that the total mass ratio (hereinafter, may also be referred to as the "seed crystal content") of aluminum and silicon in the seed crystal in terms of $Al_2O_3$ and $SiO_2$ relative to the total mass of aluminum and silicon in the raw material composition (excluding those in the seed crystal) in terms of $Al_2O_3$ and $SiO_2$ is 0 mass % or more and 30 mass % or less, 0.5 mass % or more and 20 mass % or less, 1 mass % or more and 10 mass % or less or 0.5 mass % or more and 5 mass % or less.

An example of the seed crystal that can be mixed with the raw material composition is at least one selected from the group consisting of AEI zeolite, CHA zeolite, OFF zeolite, ERI zeolite, FER zeolite, HEU zeolite, MOR zeolite, KFI zeolite, AFX zeolite, AFT zeolite, EAB zeolite, GME zeolite and LEV zeolite, and the seed crystal is preferably at least one selected from the group consisting of CHA zeolite, AEI zeolite, MOR zeolite and FER zeolite, and is preferably at least one selected from AEI zeolite and CHA zeolite.

The raw material composition is obtained by mixing the hydrothermally processed amorphous composition and an SDA, and, if necessary, a silica source etc., and is preferably obtained by mixing the hydrothermally processed amorphous composition, an SDA, an alumina source and a silica source and more preferably by mixing the hydrothermally processed amorphous composition, an SDA, an alumina source, a silica source and an alkali source. In addition, the raw material composition is preferably obtained by mixing a mixture of an SDA and a silica source etc., with the hydrothermally processed amorphous composition; for example, a mixture obtained by mixing an SDA and, if necessary, an alumina source, a silica source, an alkali source and water is mixed with the hydrothermally processed amorphous composition.

Preferable compositions of the raw material composition in terms of molar (mol) ratio are, for example, as follows: the $SiO_2/Al_2O_3$ ratio is 10 or more and 100 or less, 15 or more and 50 or less, 15 or more and 40 or less or 15 or more and 35 or less, the SDA-to-silica molar ratio (hereinafter may also be referred to as the "$SDA/SiO_2$ ratio") is 0.05 or more and 0.5 or less, 0.10 or more and 0.40 or less, 0.10 or more and 0.30 or less, 0.10 or more and 0.20 or less or 0.10 or more and 0.16 or less, the $M/SiO_2$ ratio is 0.1 or more and 0.6 or less, 0.1 or more and less than 0.3 or 0.1 or more and 0.25 or less, the $OH/SiO_2$ ratio is 0.1 or more and 0.5 or less, 0.2 or more and 0.45 or less or 0.2 or more and 0.4 or less, and the $H_2O/SiO_2$ ratio is 3 or more and 50 or less, 5 or more and 50 or less, 5 or more and 25 or less or 7 or more and 20 or less.

When the raw material composition contains sodium and at least one selected from the group consisting of potassium, rubidium and cesium, the $(K+Rb+Cs)/SiO_2$ ratio is, for example, 0 or more and 0.5 or less, 0 or more and 0.3 or less, 0 or more and 0.1 or less, 0 or more and 0.06 or less, more than 0 and 0.5 or less, more than 0 and 0.3 or less, more than 0 and 0.1 or less or more than 0 and 0.06 or less, and the $Na/SiO_2$ ratio is 0.01 or more and 1.0 or less, 0.05 or more and 0.4 or less, 0.05 or more and 0.3 or less or 0.1 or more and 0.25 or less.

The raw material composition particularly preferably has the following molar compositions. Here, M is alkali metal (in other words, all alkali metals in the raw material composition), and is preferably (Na+K).

$SiO_2/Al_2O_3$ ratio=20 or more and 50 or less and preferably 25 or more and 40 or less $Na/SiO_2$ ratio=0.05 or more and 0.3 or less and preferably 0.1 or more and 0.25 or less $M/SiO_2$ ratio=0.05 or more and 0.5 or less and preferably 0.1 or more and 0.3 or less $SDA/SiO_2$ ratio=0.1 or more and 0.3 or less and preferably 0.1 or more and 0.2 or less $OH/SiO_2$ ratio=0.1 or more and 0.4 or less and preferably 0.2 or more and 0.4 or less $H_2O/SiO_2$ ratio=8 or more and less than 20 and preferably 9 or more and 15 or less Note that when the alkali metal contained in the raw material composition is sodium only, the $M/SiO_2$ ratio is equal to the $Na/SiO_2$ ratio.

In the crystallizing step, the raw material composition is crystallized. Crystallization is preferably performed by hydrothermal synthesis. The crystallization temperature is 100° C. or higher, preferably 130° C. or higher and more preferably 160° C. or higher. The crystallization temperature need not be increased beyond what is necessary and is, for example, 200° C. or lower and preferably 180° C. or lower. The crystallization temperature may be the same as the temperature of the hydrothermal process of the amorphous composition or may be higher than that of the hydrothermal process of the amorphous composition. In crystallization, the raw material composition may be either in a stirred state or in a still-standing state. In this manner, an AEI zeolite single phase, in other words, zeolite that does not contain crystalline substances identified in XRD spectroscopy other than the AEI structure, is obtained.

The time of the crystallizing step may be any, and is, for example, 10 hours or longer and 150 hours or shorter. In particular, in this embodiment, the yield for AEI zeolite (hereinafter may simply be referred to as the "yield") can be 60% or more and 80% or less even when the time of the crystallizing step is 100 hours or shorter or even 80 hours or shorter. Furthermore, the yield can be 50, or more and 75% or less even when the time of the crystallizing step is 75 hours or shorter and more preferably shorter than 72 hours. To achieve an efficient yield, the time of the crystallizing step is preferably 24 hours or longer and shorter than 80 hours and further preferably 48 hours or longer and 75 hours or shorter. The time of the crystallizing step is the total time of the hydrothermal process of the amorphous composition and the crystallization of the raw material composition, in other words, the time needed until the crystallization of AEI zeolite is complete and the crystallinity of the AEI structure becomes constant.

In the crystallizing step, the time of the hydrothermal process of the amorphous composition and the time of the crystallization of the raw material composition may be any as long as the hydrothermal process of the amorphous composition is performed until the compositions of the amorphous composition are stabilized, and may be, for example, 5 hours or longer. The time of the crystallization of the raw material composition may be any length of time taken for AEI zeolite to crystallize. For example, within the time of the crystallizing step, the ratio of the time taken for crystallization of the raw material composition to the time taken for the hydrothermal process of the amorphous composition is 1:9 to 7:3.

The yield in the present embodiment is determined from the formula below:

$$\text{Yield (mass \%)} = W_{Cry}/W_{Raw} \times 100$$

$W_{Cry}$ and $W_{Raw}$ in the above-described formula are, respectively, a total mass of Al in terms of $Al_2O_3$ and Si in terms of $SiO_2$ in AEI zeolite and a total mass of Al in terms of $Al_2O_3$ and Si in terms of $SiO_2$ in the raw material composition.

The amorphous composition and the raw material composition preferably do not contain fluorine (F) or phosphorus (P) since production facility formed of all-purpose materials can be readily used. The amorphous composition and the raw material composition preferably each have a fluorine content and a phosphorus content of each 100 mass ppm or less, preferably each 10 mass ppm or less and yet more preferably each equal to or lower than the detection limit as determined by typical compositional analysis such as ICP measurement.

Mixing of the hydrothermally processed amorphous composition and the SDA may be conducted intermittently or continuously; alternatively, the amorphous composition, the SDA, etc., may be sequentially mixed. For example, after cooling the hydrothermally processed amorphous composition, the amorphous composition, the SDA, etc., may be mixed to prepare a raw material composition, and then the raw material composition may be heated again to perform crystallization. Meanwhile, by mixing the SDA etc., with the amorphous composition by using a pressure pump or the like, the hydrothermally processed amorphous composition and the SDA can be mixed without cooling the amorphous composition, and the raw material composition can be continuously crystallized.

The production method of the present embodiment may include at least one of a washing step, a drying step, an SDA removing step and an ion exchange step.

The washing step involves solid-liquid separation of AEI zeolite from the liquid phase. In the washing step, solid-liquid separation may be performed by a known method and AEI zeolite obtained as a solid phase may be washed with pure water.

In the drying step, water physically adsorbing onto AEI zeolite is removed. The drying conditions may be any, and for example, AEI zeolite may be dried in air at 50° C. or higher and 150° C. or lower for 2 hours or longer by allowing AEI zeolite to stand still or by drying AEI zeolite with a spray drier.

In the SDA removing step, the SDA contained in AEI zeolite is removed. An example of the SDA removing method is at least one selected from the group consisting of a liquid phase processing with an acidic aqueous solution, an exchange process with a resin, a pyrolytic process and a calcination process. From the production efficiency viewpoint, the SDA removing step is preferably at least one selected from a pyrolytic process and a calcination process.

In the ion exchange step, AEI zeolite is turned into a desired cation type. For example, when the cation type is to be ammonium ($NH_4^+$) type, AEI zeolite is mixed and stirred with an aqueous ammonium chloride solution to perform ion exchange. In addition, when the cation type is to be proton ($H^+$) type, AEI zeolite of ammonium ($NH_4^+$) type is calcined in air, for example.

One example of AEI zeolite obtained by the production method of the present embodiment is AEI zeolite that satisfies at least one selected from the following: $SiO_2/Al_2O_3$ ratio is 12.2 or more and 100 or less, preferably 14 or more and 50 or less and more preferably 15 or more and 30 or less; the average crystal size is 0.3 μm or more and 5.0 μm or less, preferably 0.4 μm or more and 3.0 μm or less and more preferably 0.5 μm or more and 3.0 μm or less; and the acid amount is 0.5 mmol/g or more and 3 mmol/g or less and preferably 1 mmol/g or more and 2 mmol/g or less.

In the present embodiment, the "crystal size" is a particle size of primary particles, and is a diameter of a particle that constitutes an independent minimum unit under observation with an electron microscope. Furthermore, the "average crystal size" is the value of the arithmetic average of crystal sizes of 30 or more (preferably 50±15) primary particles observed with an electron microscope. Thus, the secondary particle size, which is a diameter of a secondary particle formed of aggregated primary particles, the average secondary particle size, the crystal size and the average crystal size are different from this. The shape of the primary particle may be at least one selected from the group consisting of a cubic phase shape, a tetragonal phase shape and a twin phase shape which is a complex of the cubic phase shape and the tetragonal phase shape.

The "acid amount" can be determined by ammonia TPD measurement on a proton-type AEI zeolite in a state after organic matter removal.

AEI zeolite of the present embodiment has high heat resistance and undergoes less decrease in crystallinity between before and after exposure to a hydrothermal atmosphere; preferably, this decrease in crystallinity between before and after exposure to the hydrothermal atmosphere is smaller than that of typical AEI zeolite obtained by using Y zeolite as a raw material. The extent of the decrease in crystallinity attributable to exposure to the hydrothermal atmosphere can be indicated by the ratio of the crystallinity after exposure to the hydrothermal atmosphere to the crystallinity before exposure to the hydrothermal atmosphere (hereinafter, this ratio may also be referred to as the "crystallinity maintenance rate") and can be determined by comparing the intensities of the XRD peaks before and after the exposure to the hydrothermal atmosphere.

AEI zeolite of the present embodiment can be used as a catalyst support or an adsorber. Furthermore, when AEI zeolite of the present embodiment is modified with at least one selected from copper and iron, the modified AEI zeolite can be expected to be used as a catalyst, in particular, a nitrogen oxide-reducing catalyst.

EXAMPLES

The production method of the present embodiment will now be described by way of examples. However, the present embodiment is not limited to these examples.

(Identification of Crystal Phases)

XRD measurement was performed on a sample by using a typical X-ray diffractometer (instrument name: Ultima IV produced by Rigaku Corporation). CuK-α radiation (λ=1.5405 Å) was used as the radiation source, and the measurement range was in the 2θ range of from 3° to 43°. The structure of the sample was identified by comparing the obtained XRD pattern with the XRD pattern in Table 1 of PTL 1.

(Composition Analysis)

The sample was dissolved in a mixed aqueous solution of hydrofluoric acid and nitric acid to prepare a sample solution. The sample solution was measured by inductively coupled plasma-atomic emission spectroscopy (ICP-AES) by using a typical ICP apparatus (apparatus name: OPTIMA 5300DV produced by PerkinElmer Inc.). The $SiO_2/Al_2O_3$ ratio of the sample was determined from the measured values of Si and Al.

(Crystallinity Maintenance Rate)

The AEI zeolite sample before and after hydrothermal endurance process was subjected to XRD measurement in a manner similar to identifying the crystal structure. The obtained XRD pattern was subjected to a background removal process and a peak search process, and then the peak intensities of the XRD peaks corresponding to 2θ=16.9±0.2° and 17.2±0.2° were totaled to obtain the crystallinity of the AEI zeolite sample. The crystallinity maintenance rate was calculated by using the following formula.

Crystallinity maintenance rate (%)=(crystallinity after hydrothermal endurance process)÷(crystallinity before hydrothermal endurance process)×100

Example 1

Pure water, sodium hydroxide, potassium hydroxide and amorphous aluminosilicate having a $SiO_2/Al_2O_3$ ratio of 19 were mixed to obtain a composition having the following molar compositions, and this composition was used as an amorphous composition. The $M/SiO_2$ ratio in the molar compositions described below indicates $(Na+K)/SiO_2$ in the amorphous composition.

$SiO_2/Al_2O_3$ ratio=19
$Na/SiO_2$ ratio=0.12
$(K/SiO_2$ ratio=0.08)
$M/SiO_2$ ratio=0.20
$H_2O/SiO_2$ ratio=16
$OH/SiO_2$ ratio=0.20

After the amorphous composition was charged into an airtight container and hydrothermally processed at 180° C. under stirring, 1,1,3,5-tetramethylpiperidinium hydroxide (hereinafter, may also be referred to as "TMPOH"), pure water, sodium hydroxide, potassium hydroxide, amorphous aluminosilicate having a $SiO_2/Al_2O_3$ ratio of 20 and amorphous aluminosilicate having a $SiO_2/Al_2O_3$ ratio of 90 were mixed with the hydrothermally processed amorphous composition, as a result of which a raw material composition having the following molar compositions was obtained. The $M/SiO_2$ ratio in the molar compositions described below indicates $(Na+K)/SiO_2$ in the raw material composition.

$SiO_2/Al_2O_3$ ratio=30
$Na/SiO_2$ ratio=0.20
$(K/SiO_2$ ratio=0.04)
$M/SiO_2$ ratio=0.24
$TMP^+/SiO_2$ ratio=0.13
$H_2O/SiO_2$ ratio=12.7
$OH/SiO_2$ ratio=0.37

After CHA zeolite was mixed with the raw material composition such that the seed crystal content was 0.9 mass %, the raw material composition was charged into an airtight container and hydrothermally synthesized at 170° C. under stirring. The crystallizing step in this example took 70 hours.

After hydrothermal synthesis and recovery of the obtained crystallized matter by solid-liquid separation, the recovered crystallized matter was washed with pure water and dried in air at 110° C. This crystallized matter was AEI zeolite having a $SiO_2/Al_2O_3$ ratio of 21 and did not contain any crystallized matter other than AEI zeolite. The yield was 71 masse and the average crystal size was 0.55 μm.

Example 2

A raw material composition was crystallized, washed, and dried as in Example 1 except that TMPOH etc., were mixed with an amorphous composition the same as that in Example 1 such that the raw material composition had the following molar compositions. The $M/SiO_2$ ratio in the molar compositions described below indicates $(Na+K)/SiO_2$ in the raw material composition.

$SiO_2/Al_2O_3$ ratio=30
$Na/SiO_2$ ratio=0.21
$(K/SiO_2$ ratio=0.04)
$M/SiO_2$ ratio=0.25
$TMP^+/SiO_2$ ratio=0.13
$H_2O/SiO_2$ ratio=12.7
$OH/SiO_2$ ratio=0.38

The crystallizing step in this example took 70 hours, and the obtained product was AEI zeolite having a $SiO_2/Al_2O_3$ ratio of 20 and did not contain any crystallized matter other than AEI zeolite. The yield was 69 mass %.

Example 3

A raw material composition was crystallized, washed, and dried as in Example 1 except that TMPOH etc., were mixed with an amorphous composition the same as that in Example 1 such that the raw material composition had the following molar compositions. The $M/SiO_2$ ratio in the molar compositions described below indicates $(Na+K)/SiO_2$ in the raw material composition.

$SiO_2/Al_2O_3$ ratio=30
$Na/SiO_2$ ratio=0.20
$K/SiO_2$ ratio=0.04
$M/SiO_2$ ratio=0.24
$TMP^+/SiO_2$ ratio=0.14
$H_2O/SiO_2$ ratio=12.9
$OH/SiO_2$ ratio=0.38

The crystallizing step in this example took 70 hours, and the obtained product was AEI zeolite having a $SiO_2/Al_2O_3$ ratio of 20 and did not contain any crystallized matter other than AEI zeolite. The yield was 69 mass %.

Example 4

An amorphous composition was crystallized as in Example 1 except that the compositions of the amorphous composition were changed as follows and that seed crystal was used.

$SiO_2/Al_2O_2$ ratio=20
$Na/SiO_2$ ratio=0.18
$(K/SiO_2$ ratio=0.01)
$M/SiO_2$ ratio=0.19
$H_2O/SiO_2$ ratio=12
$OH/SiO_2$ ratio=0.19

A raw material composition having the following compositions was obtained by using the amorphous composition after crystallization.

$SiO_2/Al_2O_2$ ratio=26
$Na/SiO_2$ ratio=0.22
$(K/SiO_2$ ratio=0.01)
$M/SiO_2$ ratio=0.23
$TMP^+/SiO_2$ ratio=0.13
$H_2O/SiO_2$ ratio=11
$OH/SiO_2$ ratio=0.36

After adjusting the seed crystal content to 12.9 mass %, the raw material composition was charged into an airtight container and hydrothermally synthesized at 170° C. under stirring. The crystallizing step in this example took 60 hours. The obtained product was AEI zeolite having a $SiO_2/Al_2O_3$ ratio of 17 and did not contain any crystallized matter other than AEI zeolite. The yield was 65 mass %.

Comparative Example 1

Referring to the examples in U.S. Pat. No. 5,958,370, AEI zeolite was produced by using Y zeolite as a starting material. In other words, pure water, sodium hydroxide, an aqueous sodium silicate solution, Y zeolite having a $SiO_2/Al_2O_3$ ratio of 6 and 1,1-diethyl-cis-2,6-dimethylpiperidinium hydroxide (hereinafter, may also be referred to as "DEDMPOH") were mixed, and a raw material composition having the following compositions was obtained as a result.
$SiO_2/Al_2O_3$ ratio=50
$Na/SiO_2$ ratio=0.56
$DEDMPOH/SiO_2$ ratio=0.16
$H_2O/SiO_2$ ratio=44.8
$OH/SiO_2$ ratio=0.72

The zeolite content in the raw material composition was 13.9 mass %. The raw material composition was charged into an airtight container and hydrothermally synthesized at 135° C. for 168 hours under stirring. The obtained product was AEI zeolite having a $SiO_2/Al_2O_3$ ratio of 19, but the yield was 40 mass %.

Comparative Example 2

AEI zeolite was produced in accordance with the method described in Example 29 in PTL 5. In other words, pure water, potassium hydroxide, TMPOH, $Al(OH)_3$ and SNOWTEX 40 were mixed, and a raw material composition having the following compositions was obtained as a result.
$SiO_2/Al_2O_3$ ratio=15
$K/SiO_2$ ratio=0.30
$TMP^+/SiO_2$ ratio=0.15
$H_2O/SiO_2$ ratio=15
$OH/SiO_2$ ratio=0.45

5 mass % of AEI zeolite was mixed with the raw material composition, and the resulting mixture was charged into an airtight container and hydrothermally synthesized at 175° C. for 48 hours under stirring. The yield was 68 mass %, but the obtained product was AEI zeolite having a $SiO_2/Al_2O_3$ ratio of 9.7.

Comparative Example 3

Pure water, sodium hydroxide, potassium hydroxide, amorphous aluminosilicate having a $SiO_2/Al_2O_3$ ratio of 27 and TMPOH were mixed, and a raw material composition having the following compositions was obtained as a result.
$SiO_2/Al_2O_3$ ratio=27
$Na/SiO_2$ ratio=0.13
$K/SiO_2$ ratio=0.03
$M/SiO_2$ ratio=$(Na+K)/SiO_2$ ratio=0.16
$TMP^+/SiO_2$ ratio=0.20
$H_2O/SiO_2$ ratio=9.8
$OH/SiO_2$ ratio=0.36

4.3 mass % of AEI zeolite was mixed with the raw material composition, and then the resulting mixture was charged into an airtight container and hydrothermally synthesized at 170° C. for 168 hours under stirring. The obtained product was AEI zeolite having a $SiO_2/Al_2O_3$ ratio of 18. The yield was 69 mass %.

Comparative Example 4

Hydrothermal synthesis was performed as in Comparative Example 1 except that the hydrothermal synthesis was performed for 75 hours.

The obtained product was amorphous matter only, and AEI zeolite was not obtained.

Comparative Examples 3 and 4 could confirm that crystallization took a long time when a starting material containing an SDA was used.

Measurement Example

AEI zeolite obtained in Example 3 was calcined in air at 600° C.×2 hours to exchange AEI zeolite to a proton type. AEI zeolite after exchange was subjected to a hydrothermal endurance process under the following conditions to measure the crystallinity maintenance rate.
Process temperature: 900° C.
Process time: 4 hours
Process atmosphere: under moisture-containing air flow (10 vol % water, 90 vol % air)
Temperature elevation rate: 20° C./minute
Temperature elevation atmosphere: under air flow from room temperature to 200° C., under moisture-containing air flow beyond 200° C.

For comparison, AEI zeolite (hereinafter, may also be referred to as a "comparative sample") produced by structural conversion of Y zeolite was subjected to a hydrothermal endurance process in the same manner, and the crystallinity maintenance rate was measured.

The result of the crystallinity maintenance rate is shown in Table 1.

TABLE 1

|  | Crystallinity maintenance rate (%) |
|---|---|
| Example | 100 |
| Comparative Sample | 49 |

It could be confirmed from Table 1 that AEI zeolite obtained by the production method of the present embodiment had a high crystallinity maintenance rate after the hydrothermal endurance process and that crystal was more stable than AEI zeolite obtained by conversion of Y zeolite. Furthermore, AEI zeolite obtained by the production method of the present embodiment did not undergo changes in crystallinity between before and after the hydrothermal endurance process at 900° C. for 4 hours, and thus could be confirmed to have very high endurance.

All contents of the description, the claims and the abstract of Japanese Patent Application No. 2019-100637 filed May 29, 2019 are incorporated by reference as the disclosure of the description of the present disclosure.

The invention claimed is:

1. An AEI zeolite production method comprising: in sequence A) preparing an amorphous composition the amorphous composition containing no seed crystal and consisting essentially of an amorphous silica source, an amorphous alumina source, an alkali source and water wherein the amorphous silica source and the amorphous alumina source are amorphous aluminosilicate;
B) hydrothermally processing the amorphous composition prepared in A); and, thereafter
C) crystallizing a raw material composition obtained by mixing components consisting essentially of an organic structure-directing agent, the amorphous composition, seed crystal and water in such a manner that the total mass ratio of aluminum and silicon in the seed crystal in terms of $Al_2O_3$ and $SiO_2$ relative to the total mass of aluminum and silicon in the raw material composition excluding those in the seed crystal in terms of $Al_2O_3$ and $SiO_2$ is 1 mass % or more and 10 mass % or less, wherein the raw material composition does not contain Y zeolite, to obtain AEI zeolite.

2. The AEI zeolite production method according to claim 1, wherein the raw material composition has a hydroxide ion-to-silica molar ratio of 0.40 or less.

3. The AEI zeolite production method according to claim 1, wherein the amorphous composition has molar compositions below:

$SiO_2/Al_2O_3$ ratio=12 or more and 25 or less
$Na/SiO_2$ ratio=0.05 or more and 0.3 or less
$M/SiO_2$ ratio=0.05 or more and 0.4 or less
$OH/SiO_2$ ratio=0.1 or more and 0.4 or less
$H_2O/SiO_2$ ratio=8 or more and less than 20,
where "M" is an alkali metal.

4. The AEI zeolite production method according to claim 1, wherein the raw material composition has molar compositions below, where M is an alkali metal and SDA is an organic structure-directing agent:
$SiO_2/Al_2O_3$ ratio=20 or more and 50 or less
$Na/SiO_2$ ratio=0.05 or more and 0.3 or less
$M/SiO_2$ ratio=0.05 or more and 0.5 or less
$SDA/SiO_2$ ratio=0.1 or more and 0.3 or less
$OH/SiO_2$ ratio=0.1 or more and 0.4 or less
$H_2O/SiO_2$ ratio=8 or more and less than 20.

5. The AEI zeolite production method according to claim 1, wherein the raw material composition has a fluorine content of 100 mass ppm or less.

* * * * *